(12) United States Patent
Contreras

(10) Patent No.: US 7,590,811 B1
(45) Date of Patent: Sep. 15, 2009

(54) METHODS AND SYSTEM FOR IMPROVING DATA AND APPLICATION AVAILABILITY IN CLUSTERS

(75) Inventor: Cesareo Contreras, Northbridge, MA (US)

(73) Assignee: EMC Corporation, Hopkinton, MA (US)

( * ) Notice: Subject to any disclaimer, the term of this patent is extended or adjusted under 35 U.S.C. 154(b) by 182 days.

(21) Appl. No.: 11/512,547

(22) Filed: Aug. 30, 2006

(51) Int. Cl.
*G06F 12/00* (2006.01)
(52) U.S. Cl. ................ 711/162; 711/168; 711/173
(58) Field of Classification Search ............ 711/162, 711/168, 173
See application file for complete search history.

(56) References Cited

U.S. PATENT DOCUMENTS 6,543,004 B1 * 4/2003 Cagle et al. ............... 714/15
2002/0143999 A1 * 10/2002 Yamagami ............... 709/249
2002/0188709 A1 * 12/2002 McGraw et al. .......... 709/223
2007/0050574 A1 * 3/2007 Kaiya et al. .............. 711/162

* cited by examiner

*Primary Examiner*—Hyung S Sough
*Assistant Examiner*—Mehdi Namazi
(74) *Attorney, Agent, or Firm*—Daly, Crowley, Mofford & Durkee, LLP

(57) ABSTRACT

Methods and systems are disclosed that relate to making back-up data available to a host server. An exemplary method includes making primary and secondary data volumes accessible to a first server and presenting the primary data volume and the secondary data volume to the first server as a single virtual data volume. The secondary data volume is a copy of the primary data volume. The method further includes directing a server I/O request to the primary data volume if the primary data volume is accessible or to the secondary data volume if the primary data volume is not accessible and the secondary data volume is not reserved by a second server.

20 Claims, 5 Drawing Sheets

METHODS AND SYSTEM FOR IMPROVING DATA AND APPLICATION AVAILABILITY IN CLUSTERS

BACKGROUND

High-availability clusters (HA Clusters) are computer clusters that are implemented primarily for the purpose of improving the availability of the services that the cluster provides. Computer clusters generally have secondary, redundant components which can be used to provide service when a primary component fails. HA Clusters are implemented to improve the provided service by automatically switching from one or more primary components to one or more redundant components when appropriate, also known as failing over.

VERITAS CLUSTER SERVER (VCS) software, for example, can be used to reduce application downtime in HA Clusters. It provides application cluster capabilities to systems running databases, file sharing on a network, electronic commerce websites or other applications. VCS software is available from Symantec Corp. of Cupertino, Calif. MICROSOFT CLUSTER SERVER (MSCS) software also provides cluster capabilities to increase the availability of applications. MSCS software is available from Microsoft Corp. of Redmond, Wash. Both VCS and MSCS software are cluster drivers.

Generally, in order for two redundant storage systems in a cluster to be useful in protecting the cluster against a site disaster, one of the two storage systems must include a copy of the data in the other storage system. Replication software is typically used to copy the data on a primary storage system. For example, the SRDF replication software that runs on SYMMETRIX data storage systems can be used to copy data from one SYMMETRIX data storage system to another. The SRDF family of replication software and the SYMMETRIX family of data storage systems are both available from EMC Corp. of Hopkinton, Mass.

FIG. 1 illustrates a typical implementation of a cluster 100 using the SRDF family of replication software and an MSCS cluster driver. Cluster 100 includes components in two different locations. Each location includes a data volume 120 that provides data to the co-located server 140 through a switch 160. The data on primary data volume 120-1 is replicated on secondary data volume 120-2 via link 194. Cluster drivers run on each of the servers 140-1, 140-2. The servers communicate via link 192. When the primary server 140-1 is unable to run an application, the secondary server causes the application to fail over to the secondary server 140-2. The SRDF/CE software, which runs on each server, makes sure that the data volumes are ready for usage.

The inventor of the present invention recognized some limitations of cluster 100. For instance, all fail overs from one location to another are treated in the same manner—whether they are induced by a server failure or routine maintenance, on the one hand, or a data volume failure or a data volume access failure, on the other hand. Moreover, each cluster driver requires a different implementation of the cluster-enabling portion of the replication software. The cluster-enabling portion of the replication software only has access to limited information on the state of data volumes in cluster 100. Additionally, fail overs from one location to another are not handled optimally. Human intervention may be required to restart an application on the server at the surviving location. Finally, the location that continues operations after a failure of both link 192 and link 194 is uncertain.

SUMMARY OF EXEMPLARY EMBODIMENTS

The inventor of the present invention recognized that problem in making the data accessible to one server need not trigger the same response as a problem in the server itself in a geographically-dispersed fail over cluster environment. The inventor of the present invention recognized that actions required to ensure that servers have access to their data need not be linked to actions required to ensure application availability in a geographically-dispersed fail over cluster environment. The inventor of the present invention further recognized that the addition of communication links to and the use of an I/O filter driver in a cluster could improve the availability of data to a server in the cluster. The inventor recognized this improvement would, by extension, improve application availability. Accordingly, the present invention includes methods and systems that can automatically make a secondary data volume available to a host server.

One embodiment consistent with principles of the invention is a method that includes making a primary data volume accessible to a server via a first communication path; making a secondary data volume accessible to the server via a second communication path; and presenting the primary data volume and the secondary data volume to the server as a single virtual data volume. The secondary data volume is a copy of the primary data volume. The method further includes directing a server input/output (I/O) request to the primary data volume via the first communication path if the primary data volume is accessible and directing the server I/O request to the secondary data volume via the second communication path if the primary data volume is not accessible and the secondary data volume is not reserved by a second server. Consistent with principles of the invention, a data volume is "reserved by a server", for example, when the server directs its I/O requests to the data volume.

Another embodiment consistent with principles of the invention is a host server including an I/O filter configured with instructions to perform a method for automatically making back-up data available to the server. The method includes mapping a primary data volume to a first communication path, mapping a secondary data volume to a second communication path, and presenting the primary data volume and the secondary data volume to the server as a single virtual data volume. The secondary data volume is a copy of the primary data volume. The I/O filter directs an I/O request from the first server to the primary data volume if the primary data volume is accessible or to the secondary data volume if the primary data volume is not accessible and the secondary data volume is not reserved by a second server.

Additional embodiments consistent with principles of the invention are set forth in the detailed description which follows or may be learned by practice of methods or use of systems or articles of manufacture disclosed herein. It is understood that both the foregoing general description and the following detailed description are exemplary and explanatory only, and are not restrictive of the invention as claimed.

BRIEF DESCRIPTION OF THE DRAWINGS

The accompanying drawings, which are incorporated in and constitute a part of this specification, illustrate several embodiments of the invention and together with the description, serve to explain the principles of the invention. In the drawings.

DETAILED DESCRIPTION

Reference is now made in detail to illustrative embodiments of the invention, examples of which are shown in the accompanying drawings.

Figure 1:
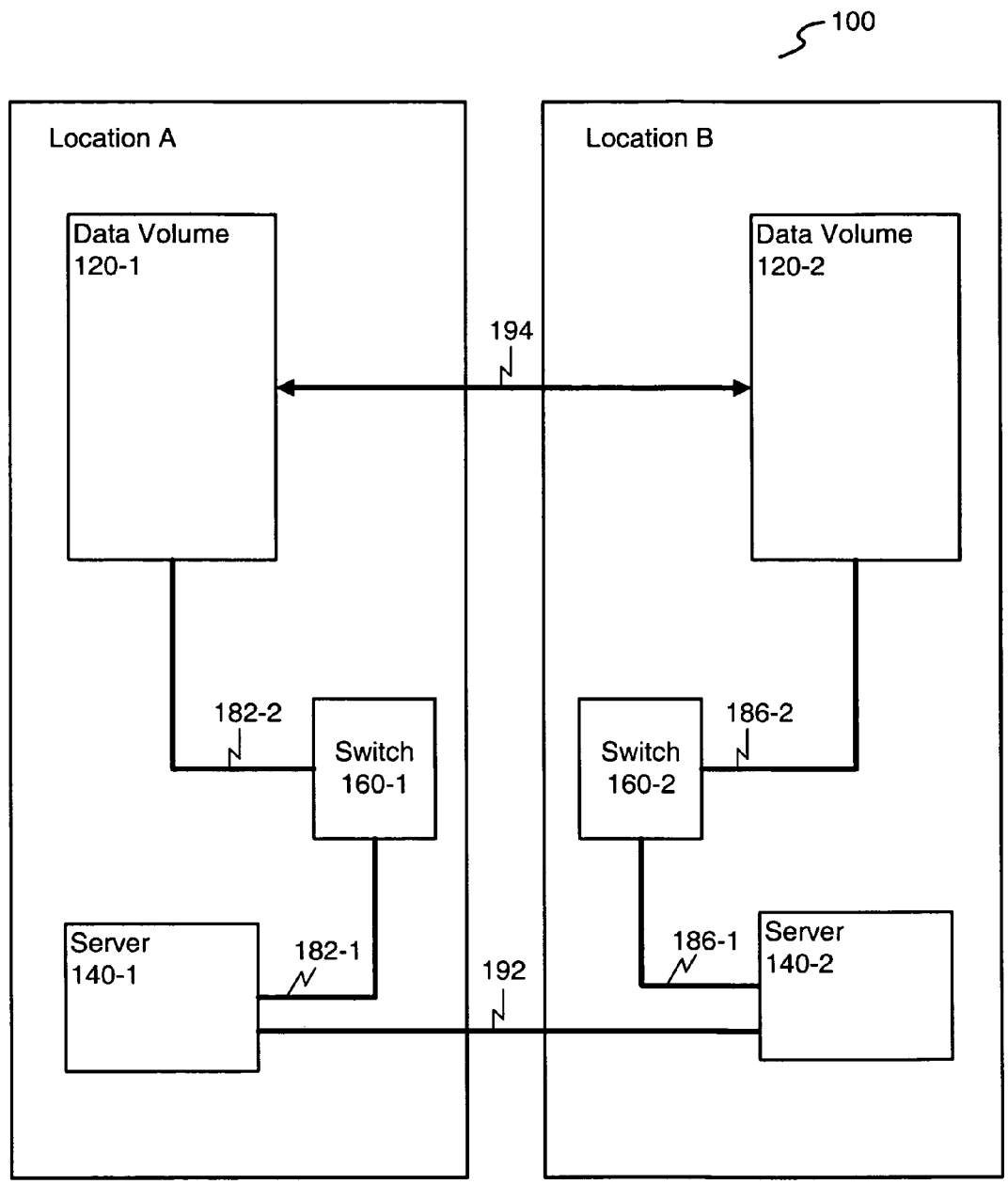
FIG. 1 illustrates an exemplary high availability computer cluster.
Figure 2:
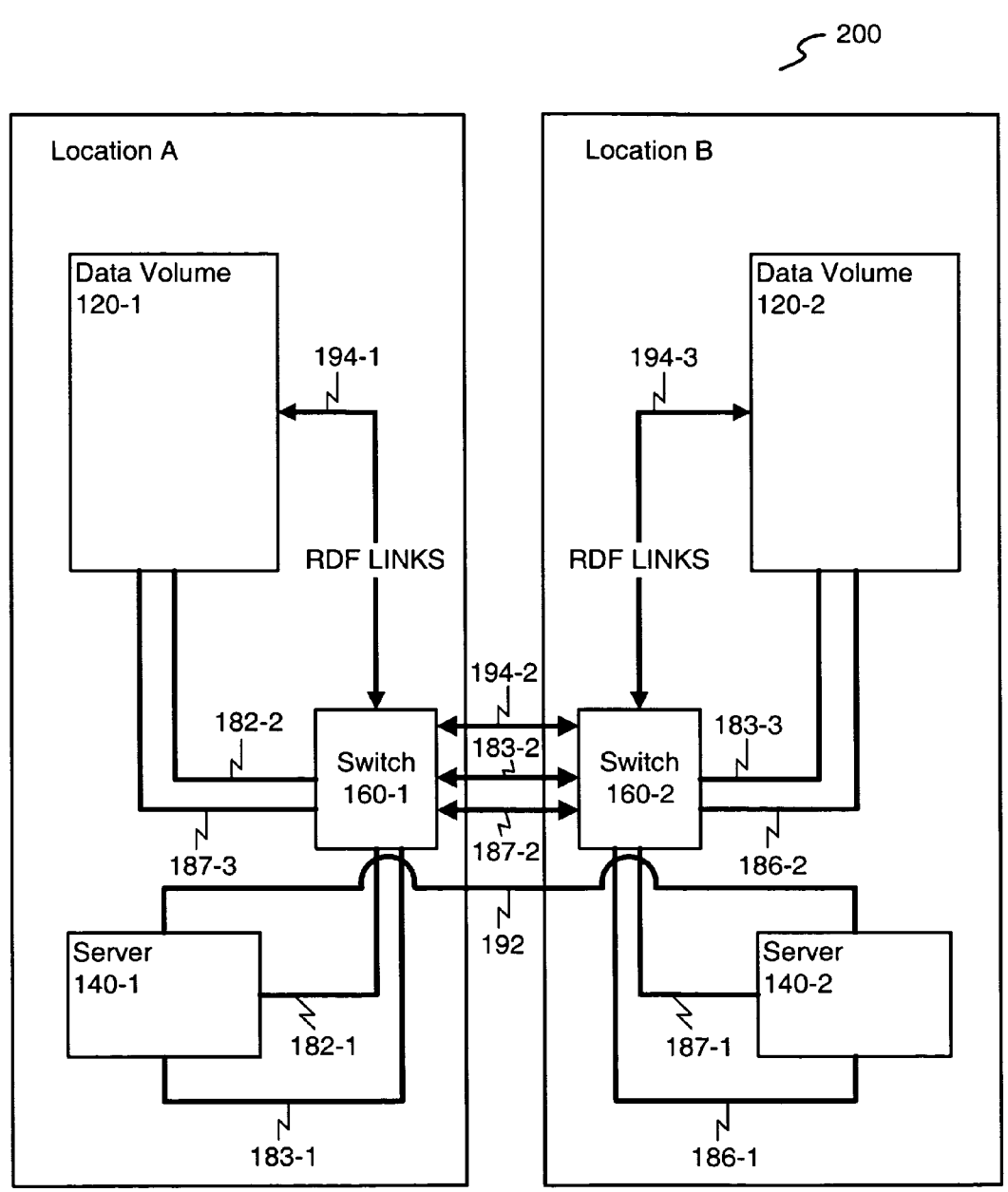
FIG. 2 illustrates an exemplary computer cluster consistent with features and principles of the present invention.

FIG. 2 illustrates an exemplary computer cluster 200 consistent with features and principles of the present invention. Like cluster 100, cluster 200 includes components in two different locations. Each location includes a data volume 120a, a server 140, and a switch 160. Cluster drivers run on each of the servers 140-1, 140-2.

The two locations may be, for example, in the same building or in different states. The locations can be selected to maximize the likely availability of the services that the cluster provides in the event of a disaster in one of the two locations. Alternatively, the locations can be selected based on the location of different groups of users.

Some of the links in cluster 200 are similar to those in cluster 100. For example, link 182 (including links 182-1 and 182-2) in cluster 200 enables communication between server 140-1 and data volume 120-1. Similarly, link 186 (including links 186-1 and 186-2) in cluster 200 enables communication between server 140-2 and data volume 120-2. Link 192 enables communications between server 140-1 and server 140-2. Finally, link 194 (including links 194-1, 194-2, and 194-3) enables communication between data volume 120-1 and data volume 120-2.

Some of the links in cluster 200 create communications paths not available in cluster 100. For example, link 183 (including links 183-1, 183-2, and 182-3) enables communication between server 140-1 and data volume 120-2. Similarly, link 187 (including links 187-1, 187-2, and 187-3) enables communication between server 140-2 and data volume 120-1.

Each link in cluster 200 enables communication between the components connected by the link. Each link can be any type of link that would enable such communication. For example, link 194 can be any connection that enables the use of the Internet Protocol (IP), such as a telephone line, a cable, or a direct service line. The telephone line can be, for example, a landline, an RF link, a cell connection, or a combination of the foregoing. Link 94 can alternatively be a connection that enables the use of another protocol, such as the Internetwork Packet Exchange (IPX) protocol. For another example, link 94 can be a simple dedicated connection, such as fiber optic communication cable. A link can be a Small Computer System Interface (SCSI) or Fibre Channel connection. Additionally, each link in cluster 200 can actually consist of a plurality of sublinks, which may or may not be of the same type.

Although cluster 200 can be implemented in a variety of ways, the simplest implementation in which location A is the primary service location and location B is the secondary service location will be described for clarity. In this implementation, server 140-1 is the primary server, data volume 120-1 is the primary data volume, and switch 160-1 is the primary switch. Similarly, data volume 120-2 is the secondary data volume, server 140-2 is the secondary server, and switch 160-2 is the secondary switch.

Each server 140 in cluster 200 processes host I/O requests. Server 140 can be a mainframe, a laptop, a personal computer, a workstation, a computer chip, a digital signal processor board, and/or any other information processing device or combination of devices. Server 140 can include a plurality of processors.

A data volume is a unit of storage that a storage system offers a host to store the host's data persistently. A data volume can reside on a particular physical storage device, such as a disk. Alternatively, a data volume can reside on a plurality of physical storage devices. Similarly, a data volume can reside on a portion of a plurality of physical storage devices. A data volume 120 in cluster 200 can be, for example, a CLARIION data storage system available from EMC Corp., a TagmaStore data storage system available from Hitachi Data Systems Corp. of Santa Clara, Calif., a FAStT data storage system available from IBM, or a SYMMETRIX data storage system also available from EMC Corp.

Each switch 160 in cluster 200 can manage communications on one or more links. For example, switch 160-1 enables communications between link 194-1 and link 194-1. A switch can generally be reconfigured so that communication between different ports on the switch can be enabled or disabled.

In the illustrative implementation of cluster 200, the data on the secondary data volume 120-2 is a copy of the data on the primary data volume 120-2. In one embodiment, the data on the secondary data volume 120-2 is a mirror of the data on the primary data volume 120-1. The data on the primary data volume 120-1 can be duplicated on the secondary data volume 120-2, for example, with the SRDF family of replication software using link 194.

Figure 3:
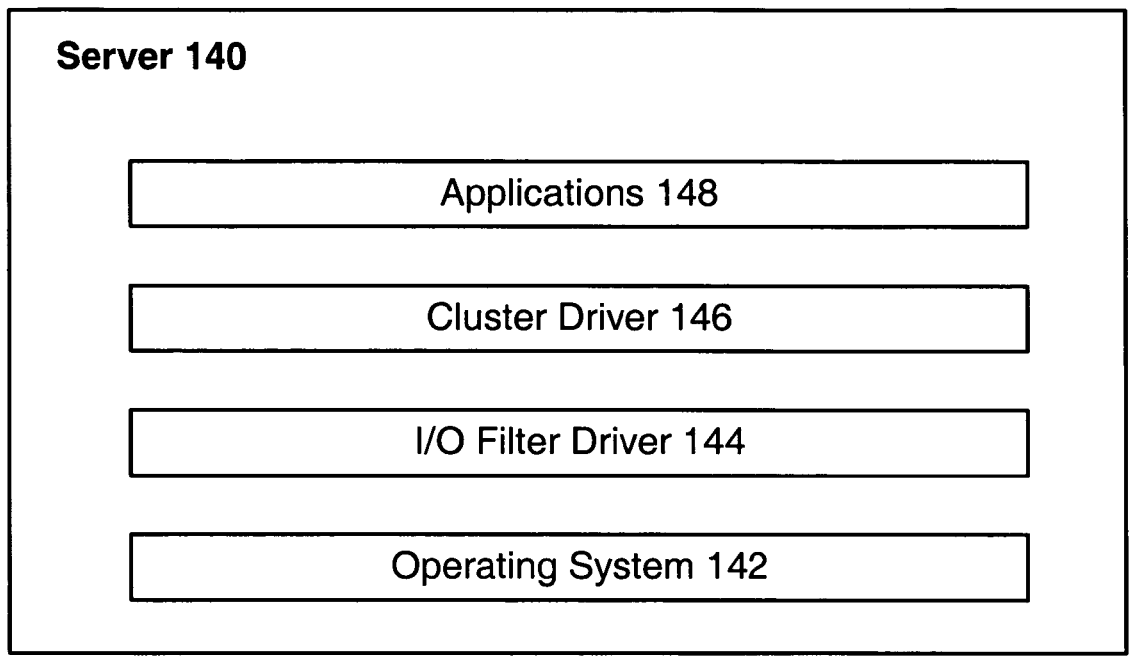
FIG. 3 illustrates a server on which layers of software are executed consistent with features and principles of the present invention.

FIG. 3 illustrates layers of software, which are executed on server 140-1 in cluster 200. The lowest layer illustrated in FIG. 3 is an operating system (OS) 142. OS 142 is a software program that manages the hardware and software resources of server 140-1 and performs basic tasks, such as controlling and allocating server memory. Above the level of OS 142, an I/O filter driver 144 resides. Above the level of I/O filter driver 144, a cluster driver 146 resides. One or more applications 148 can run above the level of cluster driver 146. Cluster driver 146 can use the inability to communicate with server 140-2 via link 192 as a basis for failing over an application. Features of the invention can be implemented at I/O filter driver 144 level.

I/O filter driver 144 can include software that performs multipath management, load-balancing, and failover functions such as POWERPATH software available from EMC. In embodiments in which I/O filter driver 144 includes multipath management functions, a path in cluster 200 may actually represent a plurality of redundant paths which are managed by I/O filter driver 144. For example, although cluster 200 includes only one link 182 between server 140-1 and data volume 120-1, I/O filter driver 144 can map a plurality of redundant paths to data volume 120-1. Similarly, although cluster 200 includes only one link 183 between server 140-1 and data volume 120-2, I/O filter driver 144 can map a plurality of redundant paths to data volume 120-2. In the exemplary embodiment, all of the paths to data volume 120-1 (equivalent to 182) are designated as primary paths and all of the paths to data volume 120-2 (equivalent to 183) are designated as secondary paths. Moreover, no path equivalent to 183 can be treated as a primary path if a path equivalent to 183 is treated as a secondary path. Consistent with an exemplary embodiment, all paths from a specific server to a specific data volume are designated as either primary or secondary links.

I/O filter driver 144 may manage the use of the redundant paths to improve the availability of data volume 120-1 to server 140-1 without any layer above I/O filter driver 144 getting any indication on which link 182 is used to access data volume 120-1.

Consistent with an exemplary embodiment of the invention, a primary data volume 120-1 is made accessible to server 140-1 and a secondary data volume 120-2 is made accessible to server 140-1. Primary and secondary data volumes 120-1, 120-2 are presented as a single virtual data volume. In the example, I/O filter driver 144 presents primary and secondary data volumes 120-1, 120-2 to higher layers of software in server 140-1 as a single virtual data volume. Generally, I/O filter driver 144 directs an I/O request to primary data volume 120-1 if primary data volume 120-1 is available. If primary data volume 120-1 is not accessible and secondary data volume 120-2 is not reserved, I/O filter driver 144 can direct the I/O request to secondary data volume 120-2.

The primary data volume 120-1 and the secondary data volume 120-2 can be reserved by server 140-1, for example, when server 140-1 sends a periodic signal to the virtual data volume indicating ownership of that data volume. Typically, the primary data volume 120-1 and the secondary data volume 120-2 are reserved as a virtual data volume. A reservation of the secondary data volume 120-2 by server 140-1 would not prevent another server from reserving the secondary data volume 120-2 if server 140-1 could not access data volume 120-1 or data volume 120-2. On the other hand, a reservation of the secondary data volume 120-2 by server 140-1 would prevent another server from reserving the secondary data volume 120-2 while server 140-1 can access data volume 120-1 or data volume 120-2.

Figure 4:
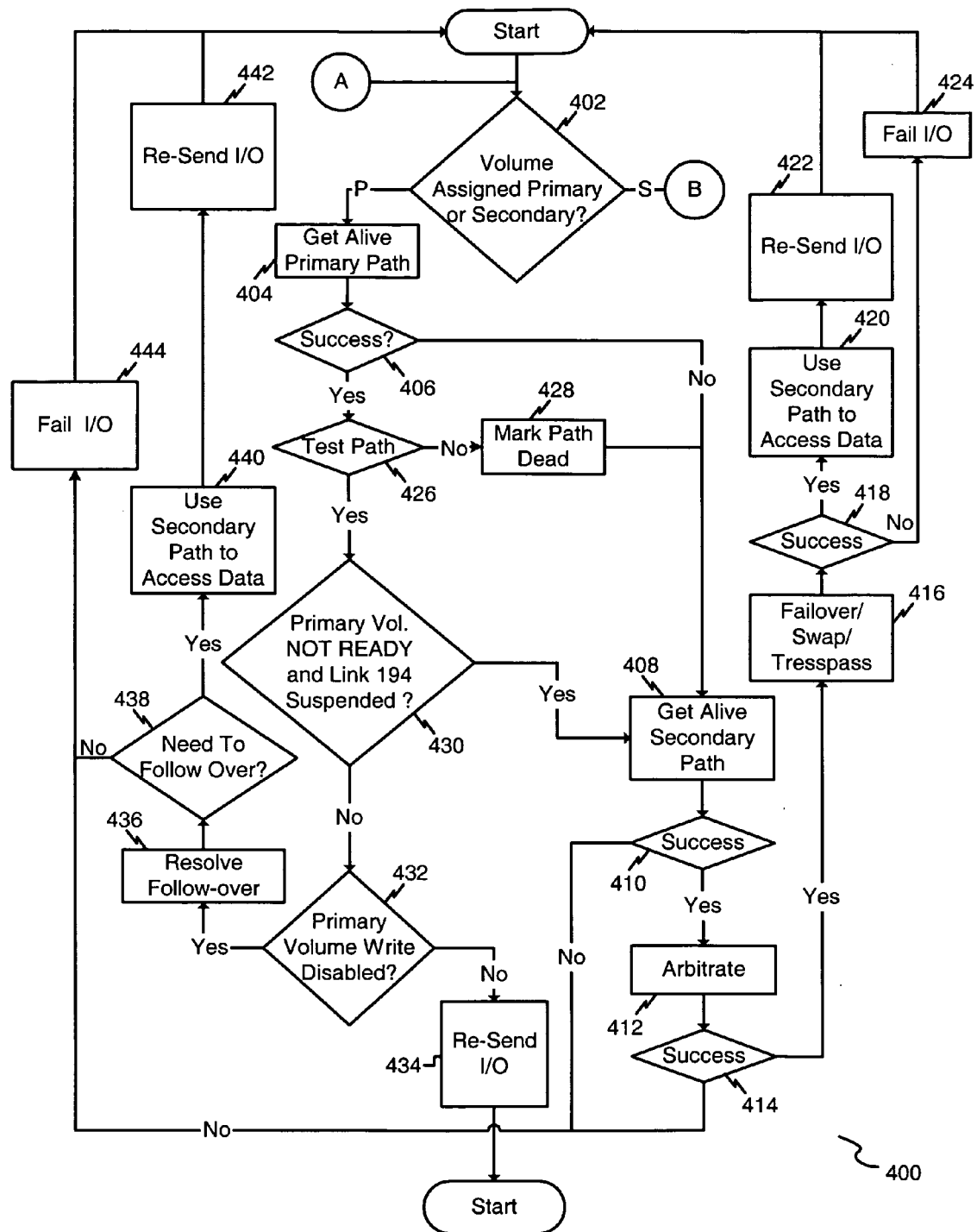
FIG. 4 illustrates an exemplary flow chart related to failing over from a primary data volume to a secondary data volume consistent with features and principles of the present invention.

FIG. 4 illustrates an exemplary method 400 enabling cluster 200 to fail over from primary data volume 120-1 to secondary data volume 120-2 consistent with features and principles of the present invention. Exemplary method 400 is implemented at least in part in I/O filter driver 144 such that data volume 120-1 is normally designated the primary data volume and data volume 120-2 is normally designated the secondary data volume. Method 400 starts at the top center of the flowchart after an I/O request has failed.

In stage 402, driver 144 checks if the target volume is designated a primary data volume or a secondary data volume. If the target volume has been designated the secondary data volume, a fail over has occurred and the logic proceeds to FIG. 5. If the target volume has been designated the primary data volume, method 400 proceeds to stage 404. In stage 404, driver 144 tries to identify an alive primary path mapped to the data. In stage 406, driver 144 determines if it has successfully identified an alive primary path. If not, in stage 408, driver 144 tries to identify an alive secondary path mapped to the data. In stage 410, driver 144 determines if it has successfully identified an alive secondary path. If it has, in optional stage 412, driver 144 arbitrates with other servers in cluster 200.

The process by which a server 140 determines which server in a cluster has control of a target data volume 120 and if control can be taken by a new server 140 is known as arbitration. Arbitration can include, for example, the new server 140 determining if the target data volume is reserved. Consistent with features and principles of the present invention, arbitration can be performed using links 182, 183, 186, 187, and 192. In some embodiments, server 140-1 must successfully arbitrate with server 140-2 before failing over to associated secondary data volume 120-2, or more specifically before directing an I/O request to associated secondary data volume 120-2. Arbitration can include determining that associated secondary data volume 120-2 is not reserved, or flagged for use by server 140-2 for example.

If arbitration stage 412 in method 400 is successful, driver 144 fails over from data volume 120-1 to data volume 120-2. A fail over from data volume 120-1 to data volume 120-2 can be effectuated, for example, by directing data volume 120-2 to change its status to write enabled with respect to server 140-1. Such a fail over is done to enable server 140-1 to continue accessing the data on data volumes 120-1, 120-2 despite the fact that link 182 (or any equivalents thereto) is not alive. In stage 418, driver 144 determines if the fail over was successful. If fail over stage 416 is successful, in stage 420, driver 144 is set to use link 183 (or any equivalents thereto) to access the data on data volumes 120-1, 120-2. In stage 422, the failed I/O request is resent using link 183 (or any equivalent thereto) to access the data on data volume 120-2.

If get alive secondary path stage 410 is not successful, the I/O request fails because there are no live paths to data volume 120-1 or to data volume 120-2. If fail over stage 416 is not successful, the I/O request fails because there are no live paths to data volume 120-1 and driver 144 cannot fail over to data volume 120-2.

Driver 144 may determine in stage 406 that it has identified an alive primary path. If stage 406 is successful, method 400 proceeds to stage 426. In stage 426, driver 144 tests the identified primary path. If the identified primary path does not work, it is marked dead in stage 428. If the identified primary path does work, method 400 proceeds to stage 430. In stage 430, driver 144 determines if data volume 120-1 is not ready and link 194 is suspended. If so, method 400 proceeds to stage 408 because the foregoing stages suggest that data volume 120-1 cannot be accessed, and that data volume 120-2 must be used.

If not, method 400 proceeds to stage 432 in which driver 144 determines if data volume 120-1 is write disabled. If data volume 120-1 is not write disabled, driver 144 can resend the failed I/O request in stage 434. If data volume 120-1 is write disabled, fail over may have occurred. Accordingly, method 400 proceeds to stage 436. In stage 436, driver 144 analyzes data obtained from data volume 120-1 and the OS to determine if cluster 200 settings have been modified. In stage 438, driver checks if data volume 120-2 is now being used as the primary data volume. If not, in stage 444, the I/O request fails because it is not possible to deliver the I/O request via link 182 or link 183 (or any equivalents thereto). If so, in stage 440, driver 144 is set to use link 183 (or any equivalents thereto) to access the data on data volumes 120-1, 120-2. In other words, secondary data volume 120-2 is set for use as the primary data volume. In stage 442, the failed I/O request is resent using link 183 (or any equivalent thereto) to access the data on data volume 120-2.

Figure 5:
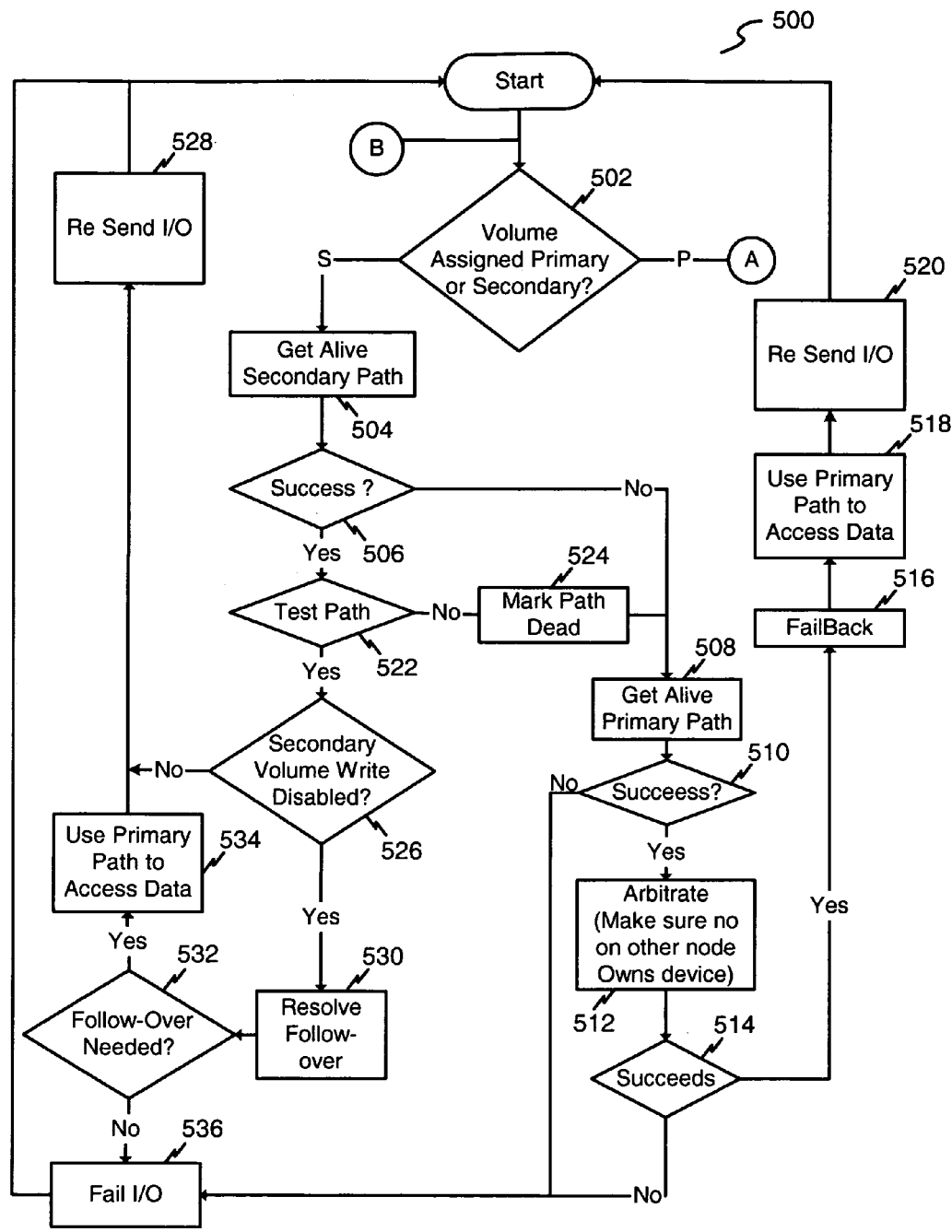
FIG. 5 illustrates an exemplary flow chart related to failing back from a secondary data volume to a primary data volume consistent with features and principles of the present invention.

FIG. 5 illustrates an exemplary method 500 enabling cluster 200 to fail back from secondary data volume 120-2 to primary data volume 120-1 consistent with features and principles of the present invention. Exemplary method 500 is implemented at least in part in I/O filter driver 144 such that data volume 120-1 is normally designated the primary data volume and data volume 120-2 is normally designated the secondary data volume. Method 500 starts at the top center of the flowchart after an I/O request failure and a fail over.

In stage 502, driver 144 checks if the target volume is designated a primary data volume or a secondary data volume. If the target volume has been designated the primary data volume, no fail over has occurred and the logic proceeds to FIG. 4. If the target volume has been designated the secondary data volume, method 500 proceeds to stage 504. In stage 504, driver 144 tries to identify an alive secondary path mapped to the data. In stage 506, driver 144 determines if it has successfully identified an alive secondary path. If not, in stage 508, driver 144 tries to identify an alive primary path mapped to the data. In stage 510, driver 144 determines if it has successfully identified an alive primary path. If it has, in optional stage 512, driver 144 arbitrates with other servers in cluster 200.

If arbitration stage 512 in method 500 is successful, driver 144 fails back from data volume 120-2 to data volume 120-1. A fail back from data volume 120-2 to data volume 120-1 can be effectuated, for example, by directing data volume 120-1 to change its status to write enabled with respect to server 140-1. Such a fail back is done to enable server 140-1 to start accessing the data on data volumes 120-1, 120-2 from data volume 120-1. Such a fail back should only be done when data volume 120-1 is accessible and it has been determined that it is safe to access the data on data volume 120-1. In stage 518, driver 144 is set to use link 182 (or any equivalents thereto) to access the data on data volumes 120-1, 120-2. In stage 520, the failed I/O request is resent using link 182 (or any equivalent thereto) to access the data on data volume 120-1.

If get alive secondary path stage 510 is not successful, the I/O request fails because there are no live paths to data volume 120-1 or to data volume 120-2.

Driver 144 may determine in stage 506 that it has identified an alive secondary path. If so, method 500 proceeds to stage 522. In stage 533, driver 144 tests the identified secondary path. If the identified primary path does not work, it is marked dead in stage 524. If the identified primary path does work, method 500 proceeds to stage 526. In stage 526, driver 144 determines if data volume 120-2 is write disabled. If data volume 120-2 is not write disabled, driver 144 can resend the failed I/O request in stage 528.

If data volume 120-2 is write disabled, fail back may have occurred. Accordingly, method 500 proceeds to stage 530. In stage 530, driver 144 analyzes data obtained from data volume 120-2 and the OS to determine if cluster 200 settings have been modified. In stage 532, driver checks if data volume 120-1 is now being used as the primary data volume. If not, in stage 536, the I/O request fails. If so, in stage 534, driver 144 is set to use link 182 (or any equivalents thereto) to access the data on data volumes 120-1, 120-2. In other words, primary data volume 120-1 is set for use as the primary data volume. In stage 528, the failed I/O request is resent using link 182 (or any equivalent thereto) to access the data on data volume 120-1.

An advantage of the present invention is that it enables a server 140 in cluster 200 to load balance. For example, since server 140-1 can access data volume 120-1 via link 182 and data volume 120-2 via link 183, server 140-1 can use each data volume as a primary data volume for some purposes. Server 140-1 can use the other data volume as the backup. Similarly, since server 140-2 can access data volume 120-1 via link 187 and data volume 120-2 via link 186, server 140-2 can use each data volume as a primary data volume for some purposes. This arrangement can increase the efficiency of cluster 200.

Server 140-1 can periodically query each data volume made accessible to the server to check that it remains accessible. Alternatively, server can query specific data volumes after an I/O request fails following predefined logic to determine which data volumes remain accessible.

Similar benefits could be realized with alternative implementations of cluster 200. For example, server 140-1 can be the primary server for some applications and the secondary server for other applications. In that example, server 140-2 can also be the primary server for some applications and the secondary server for other applications. For another example, server 140-1 can be the primary server for some hosts and the secondary server for other hosts. In that example, server 140-2 can also be the primary server for some hosts and the secondary server for other hosts. Additionally, data volume 120-1 need not provide the primary data storage for server 140-1. Moreover, data volume 120-1 can provide primary data storage for some hosts using server 140-1, but not other hosts. In such an embodiment, a server can direct one host's I/O requests to the data volume 140-1 via the first communication path if that data volume is accessible and another's host's I/O requests to data volume 140-2 via the second communication path if that data volume is accessible. Consistent with features and principles of the present invention, multiple applications can run on a single server 140 at one time. A virtual data volume, however, can only be used by a single instance of an application at one time.

Similar benefits could be realized with a cluster having more components than cluster 200. For example, additional links between components in cluster 200 could be added. For another example, additional components could be added to a location in cluster 200. Location A, for instance, can include a second data volume. Similarly, a third location could include components corresponding to those in location A. These components could be interlinked to components in cluster 200. In such an embodiment, a third data volume is made available to the primary server in cluster 200 and the three data volumes are presented to the primary server as a single virtual data volume. Moreover, components not described herein could be added to cluster 200.

The embodiments and aspects of the invention set forth above are only exemplary and explanatory. They are not restrictive of the invention as claimed. Other embodiments consistent with features and principles are included in the scope of the present invention. As the following sample claims reflect, inventive aspects may lie in fewer than all features of a single foregoing disclosed embodiment. Thus, the following claims are hereby incorporated into this description, with each claim standing on its own as a separate embodiment of the invention.

What is claimed is:

1. A method for automatically making back-up data available to a first host server comprising:
    making a primary data volume accessible to a first server via a first communication path;
    making a secondary data volume accessible to the first server via a second communication path;
    presenting the primary data volume and the secondary data volume to the first server as a single virtual data volume, wherein the secondary data volume is a copy of the primary data volume;
    directing a server I/O request to the primary data volume via the first communication path if the primary data volume is accessible; and
    directing the server I/O request to the secondary data volume via the second communication path if the primary data volume is not accessible and the secondary data volume is not reserved by a second server.

2. The method of claim 1 wherein the primary data volume is a networked storage array.

3. The method of claim 1 wherein the secondary data volume is a mirror of the primary data volume.

4. The method of claim 1 wherein the primary data volume is not accessible when the first communication path is down.

5. The method of claim 1 wherein the primary data volume is not accessible when the primary data volume fails.

6. The method of claim 1 further comprising after directing the server I/O request to the secondary data volume, evaluating the primary data volume and the first communication path and continuing to direct server I/O requests to the secondary volume until the primary data volume is accessible and ready.

7. The method of claim 1 further comprising:
   making a tertiary data volume accessible to the first server via a third communication path;
   presenting the primary data volume, the secondary data volume, and the tertiary data volume to the first server as a single virtual data volume, wherein the secondary data volume and the tertiary data volume are both a copy of the primary data volume; and
   directing server I/O requests to the tertiary data volume via the third communication path if the primary data volume and the secondary data volume are not accessible and the tertiary data volume is not reserved by a second server.

8. The method of claim 1 wherein directing the server I/O request to the secondary data volume only occurs if the primary data volume is not accessible to the first server or to the second server.

9. A method for automatically making back-up data available to a host server comprising:
   making a primary data volume accessible to a cluster driver on the first server via a first communication path;
   making a secondary data volume accessible to the cluster driver on the first server via a second communication path;
   presenting the primary data volume and the secondary data volume to the cluster driver on the first server as a single virtual data volume, wherein the secondary data volume is a copy of the primary data volume;
   directing a server I/O request to the primary data volume via the first communication path if the primary data volume is accessible; and
   directing the server I/O request to the secondary data volume via the second communication path if the primary data volume is not accessible and the secondary data volume is not reserved by a second server.

10. The method of claim 9 wherein the cluster driver controls when an application fails over to the second server.

11. The method of claim 9 wherein the cluster driver receives no indication when the server I/O request has been directed to the secondary data volume.

12. A first host server comprising an input/output (I/O) filter configured with instructions to perform a method for automatically making data available to the first server, the method comprising:
   mapping a primary data volume to a first communication path;
   mapping a secondary data volume to a second communication path;
   presenting the primary data volume and the secondary data volume to the first server as a single virtual data volume, wherein the secondary data volume is a copy of the primary data volume;
   directing an I/O request from the first server to the primary data volume if the primary data volume is accessible and not reserved by a second server; and
   directing the I/O request from the first server to the secondary data volume if the primary data volume is not accessible and the secondary data volume is not reserved by the second server.

13. The first server of claim 12 wherein the primary data volume and the secondary data volume are presented to a cluster driver on the first server as the single virtual data volume.

14. The first server of claim 13 wherein the cluster driver controls when an application fails over to the second server.

15. The first server of claim 12 wherein the secondary data volume is a mirror of the primary data volume.

16. The first server of claim 12 wherein I/O driver comprises a server group flag and directs the I/O request from the first server to the secondary data volume if the primary data volume is not accessible to a server having the same server group flag designation.

17. The first server of claim 12 wherein the primary data volume is not accessible when a communication path to the primary data volume is down.

18. The first server of claim 12 wherein the primary data volume is not accessible when the primary data volume fails.

19. The first server of claim 12 wherein the I/O driver after directing the I/O request from the first server to the secondary data volume, evaluates the primary data volume and continues to direct I/O requests from the first server to the secondary data volume until the primary data volume is accessible and ready.

20. The first server of claim 12 wherein the method implemented by the I/O driver further comprises:
   mapping a tertiary data volume accessible to a third communication path;
   presenting the primary data volume, the secondary data volume, and the tertiary data volume to the first server as a single virtual data volume, wherein the secondary data volume and the tertiary data volume are each a copy of the primary data volume; and
   directing I/O requests from the first server to the tertiary data volume if the primary data volume and the secondary data volume are not accessible and the tertiary data volume is not reserved by the second server.

\* \* \* \* \*